United States Patent [19]

Bickel

[11] Patent Number: 4,483,103
[45] Date of Patent: Nov. 20, 1984

[54] DRESSING APPARATUS FOR A DISHED GRINDING WHEEL AT A TOOTH FLANK-GRINDING MACHINE

[75] Inventor: Hansjörg Bickel, Au, Switzerland

[73] Assignee: Maag Gear-Wheel & Machine Company Limited, Zürich, Switzerland

[21] Appl. No.: 127,368

[22] Filed: Mar. 4, 1980

[30] Foreign Application Priority Data

Mar. 17, 1979 [CH] Switzerland ............ 2503/79

[51] Int. Cl.³ .................... B24B 49/18
[52] U.S. Cl. ............. 51/165.87; 125/11 CC; 125/11 CD
[58] Field of Search ......... 51/165.87, 165.88; 125/11 CC, 11 CD, 11 TP

[56] References Cited

U.S. PATENT DOCUMENTS

| | | | |
|---|---|---|---|
| 1,183,020 | 5/1916 | Maag | 51/165.88 |
| 1,228,798 | 6/1917 | Maag | 51/165.88 |
| 2,555,852 | 6/1951 | Hawley | 125/11 CD |
| 3,928,943 | 12/1975 | Wirz | 51/169.87 |
| 4,143,637 | 3/1979 | Mesey | 125/11 CC |
| 4,213,277 | 7/1980 | Fivan | 51/165.88 |

Primary Examiner—Harold D. Whitehead
Attorney, Agent, or Firm—Werner W. Kleeman

[57] ABSTRACT

A dressing apparatus for a dished or plate-shaped grinding wheel of a tooth flank-grinding machine, comprising a dressing carriage or slide which can be radially advanced or fed by means of a radial drive in relation to the grinding wheel. The dressing carriage supports a dressing tool which serves for dressing the outer surface of the grinding wheel and a feeler which serves to scan the active end surface or rim of the grinding wheel. The feeler serves to control the axial advancing or infeed movement of the grinding wheel, and such feeler, during such advancing movement, always moves radially with respect to the grinding wheel. The dressing tool is arranged upon a tool support in off-set relation to the feeler in the peripheral or circumferential direction of the grinding wheel. The tool support is adjustably arranged at the dressing carriage or slide for movement essentially parallel to the active end surface or rim of the grinding wheel and is controlled by an auxiliary or additional drive which is connected with the radial drive.

9 Claims, 5 Drawing Figures

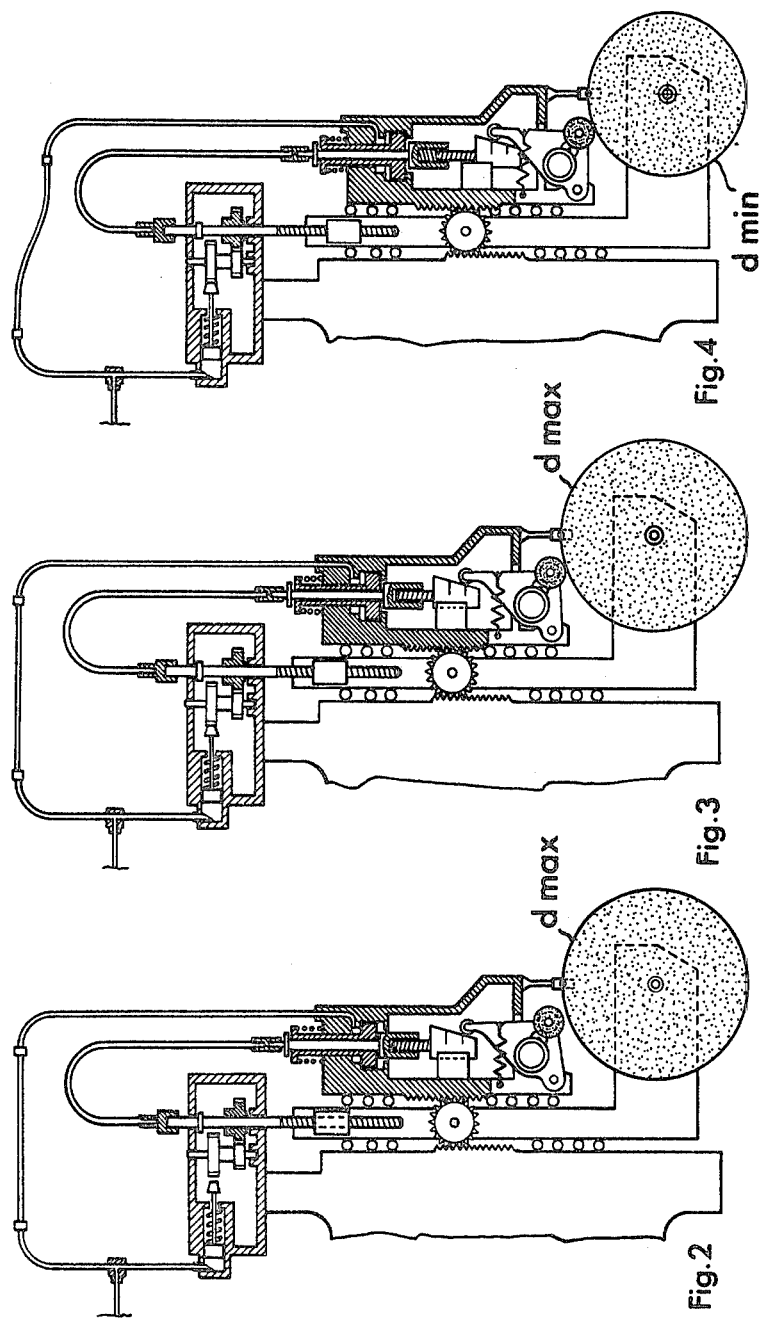

DRESSING APPARATUS FOR A DISHED GRINDING WHEEL AT A TOOTH FLANK-GRINDING MACHINE

BACKGROUND OF THE INVENTION

The present invention relates to a new and improved construction of a dressing apparatus for a substantially plate-shaped or dished grinding wheel of a tooth flank-grinding machine.

Generally speaking, the dressing apparatus of the present development is of the type comprising a dressing carriage or slide which can be radially advanced or fed by means of a radial drive in relation to the grinding wheel. The dressing carriage carries a dressing tool for dressing the outer surface of the grinding wheel and a feeler for scanning the working end surface or active rim of the grinding wheel and for controlling its axial advance or infeed movement, the feeler always moving radially with respect to the grinding wheel during the advancing or infeed movement.

According to a prior art dressing apparatus of this species, for instance as disclosed in the German Pat. No. 2,644,890 and the corresponding U.S. Pat. No. 4,143,637, the dressing tool is constituted by a rotating dressing disk which is effective at its end face, this rotating dressing disk or wheel being mounted at the dressing carriage in such a manner that its axis of rotation extends radially with respect to the grinding wheel and coincides with the direction in which the dressing carriage is advancable by the radial drive. The feeler for controlling the axial advance motion of the grinding wheel, and which has not been illustrated in the aforementioned German Pat. No. 2,644,890, is attached at the dressing carriage such that it scans the end surface of the grinding wheel directly radially within the working location of the dressing tool. This arrangement has been found to be satisfactory for grinding methods, such as the 0°-grinding method (discussed for instance in applicant's handbook, entitled "MAAG-Taschenbuch (MAAG-Gear Book), Zürich, 1963, pages 259 et seq), wherein two mutually parallelly arranged grinding wheels simultaneously engage at a respective tooth flank, and thus, only work with a small outer marginal region of their free end surface. If it is intended to realize with such grinding techniques high dimensional accuracy and surface quality, then the active end surface of the grinding wheel or each grinding wheel, as the case may be, must be checked at brief time intervals by a feeler and, depending upon the response of a control device, must be axially repositioned and possibly dressed, and furthermore, the outer surface of the grinding wheel must be machined at certain time intervals, so that it forms, together with the end surface, a sharp edge or rim and always remains at just that width which avoids any crumbling of the grinding wheel at its outer rim or edge.

There have also become known to the art grinding techniques wherein a sharp-edged grinding wheel rim is not an absolute requirement and is not even desirable in consideration of economical utilization of the grinding wheel. Even so, with such grinding techniques it is necessary to dress the grinding wheel or each grinding wheel at certain time intervals at their end surface and, usually over larger time intervals, also at their rounded outer surface. There is preferably used for the dressing of the outer surface a dressing tool in the form of a roll, the axis of rotation of which is arranged parallel to that of the grinding wheel and whose outer surface profile is complementary to that of the grinding wheel. When using such dressing tool or others which are suitable for dressing a rounded rim or edge of the grinding wheel, it is difficult to secure the feeler serving to control the axial advance movements of the grinding wheel in such a manner at the dressing carriage that it directly scans the narrow ring-shaped end surface of the grinding wheel directly radially within the dressing tool which dresses the grinding wheel-rim or edge. It would be conceivable to arrange this feeler upon a separate feeler carriage which is independent of the dressing carriage. This feeler carriage then could be advanced in synchronism with the dressing carriage at a predetermined angle with respect thereto and radially in relation to the grinding wheel. Yet, this arrangement would require considerable equipment expenditure, firstly, because the movements of the dressing tool and the feeler must be coordinated extremely accurately with respect to one another, so that the grinding wheel always has the required shape and position in relation to the tooth flank which is to be ground, and accordingly, is able to produce the requisite working accuracy

SUMMARY OF THE INVENTION

It is therefore a primary object of the present invention to provide for a dressing apparatus of the previously mentioned type sufficient work space for a dressing tool suitable for dressing a round grinding wheel edge, while still maintaining the requisite coordination between the movement of the feeler and the dressing tool in a most simple manner.

Now in order to implement this object and others which will become more readily apparent as the description proceeds, the dressing tool is arranged upon a tool support or carrier so as to be offset in relation to the feeler in the peripheral direction of the grinding wheel. The tool support is arranged to be adjustable or displaceable at the dressing carriage parallel to the working end surface or active rim of the grinding wheel and is controlled by an auxiliary drive which is connected with the radial drive.

The dressing tool therefore, just like the feeler, participates in the radial advance or feed movement of the dressing carriage or slide. Due to the offset arrangement of the dressing tool in relation to the feeler each advance movement of the dressing carriage means, however, that there is carried out a movement of the dressing tool along a path of travel which does not coincide with the radial path of motion of the feeler. The auxiliary drive insures that the dressing tool, notwithstanding its deviating path of movement, engages at the outer or jacket surface of the grinding disk always in the desired manner, independent of the degree of wear of the grinding wheel or disk.

According to one constructional manifestation of the invention, which is particularly preferred because of its simplicity, the tool support is constituted by a rocker arm or balance which is pivotably mounted upon the dressing carriage. The tool support could also be, however, structured to be displaceable upon the dressing carriage.

If the radial drive for the dressing carriage comprises a threaded spindle, as such is the case for the previously described state-of-the-art dressing apparatus, then the auxiliary or additional drive advantageously likewise contains an additional threaded spindle mounted at the dressing carriage, this threaded spindle being coupled with the threaded spindle of the radial drive, for instance by means of a flexible shaft.

According to a further construction of the invention the additional threaded spindle is connected with a piston for common axial shifting or displacement. The piston is displaceably arranged, in the lengthwise direction of the additional threaded spindle, within a cylinder formed at the dressing carriage. In this way there is realized the possibility of bringing the dressing tool, by rotation of the threaded spindle, into a base position which is accommodated to the momentary diameter of the grinding wheel, and where it has a certain spacing from the outer surface of the grinding wheel, and from which, in response to a signal, it can be brought into engagement with the grinding wheel by shifting the piston.

The additional or auxiliary drive is particularly then simple in construction if, according to a further feature of the invention, the additional threaded spindle is conjointly driven with the threaded spindle of the radial drive by means of a pawl by a piston within a cylinder. This last-mentioned cylinder is conjointly connected, together with the cylinder formed at the dressing slide, by means of a valve to a source of pressurized fluid medium.

The additional threaded spindle can be in direct threaded engagement with the tool support, particularly if such is linearly displaceable. Particularly in those cases where the tool support or carrier is a rocker arm or balance, it is an important further aspect of the invention that the additional threaded spindle engages with a cam or templet which is displaceably guided at the dressing carriage and supports the tool support. By appropriately configuring the cam or equivalent structure the additional movement of the tool support can have imparted thereto any desired characteristic which is accommodated to the radial advance or feed movement of the dressing carriage.

With the inventive dressing apparatus it is possible, just as for the previously described state-of-the-art dressing apparatus, to guide the dressing carriage at a grinding wheel support—sometimes briefly referred to as grinder support—carrying the grinding wheel and, in turn, being guided at a support. This design can be further expanded upon according to the teachings of the invention in that, a pinion is mounted at the grinding support and which engages with two oppositely situated racks. One of the racks is formed or secured at the support and the other at the dressing carriage.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2 illustrates the inventive dressing apparatus shown in FIG. 1 in a base position;

FIG. 3 illustrates the same dressing apparatus during dressing of an almost new grinding wheel having a correspondingly large wheel diameter;

FIG. 4. illustrates the same dressing apparatus during the dressing of an almost consumed grinding wheel with correspondingly small diameter of the grinding wheel.

DETAILED DESCRIPTION OF THE PREFERRED EMBODIMENTS

Figure 1:
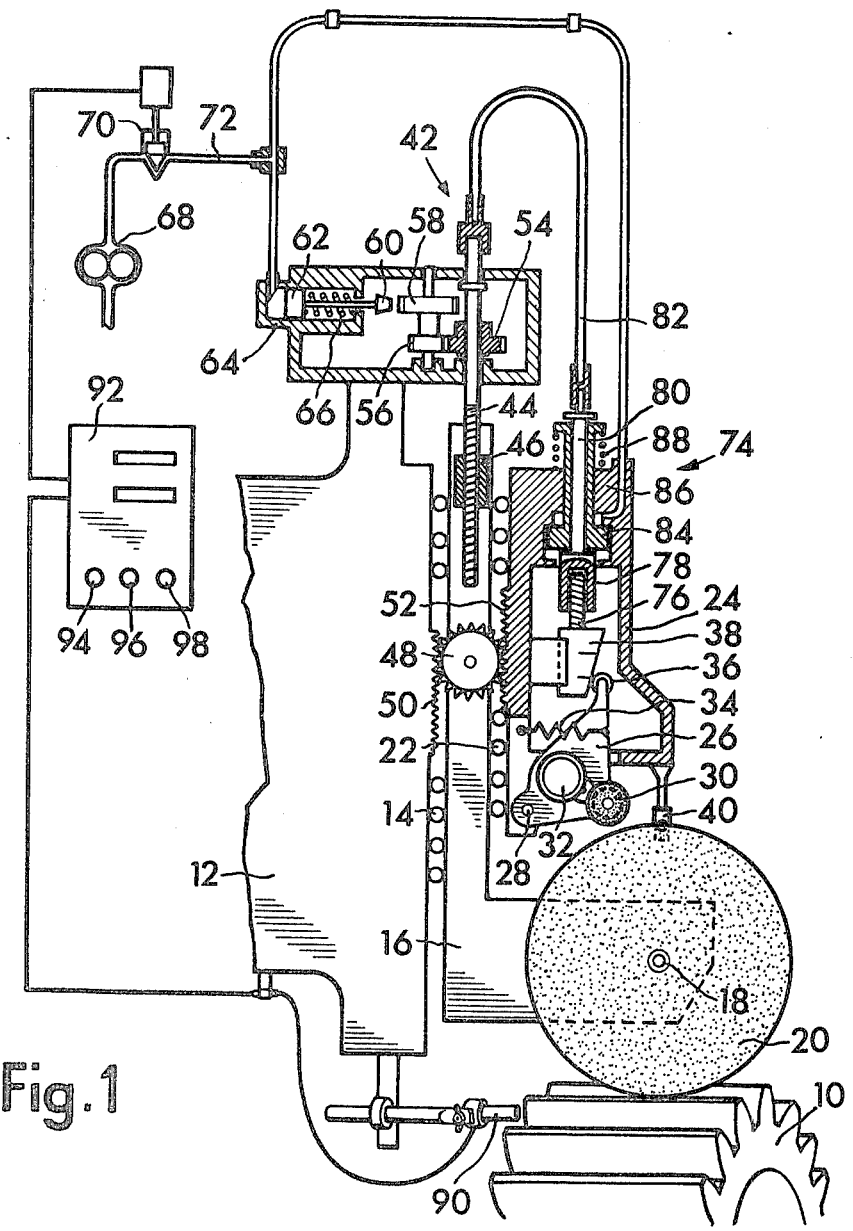
FIG. 1 illustrates, partially in sectional view, a dressing apparatus for a tooth flank-grinding machine and constructed according to the invention.

Describing now the drawings, the exemplary illustrated embodiment of dressing apparatus can be part of or an accessory of a gear tooth flank-grinding machine, which, for instance according to the showing of FIG. 1, grinds tooth flanks of involute-shaped profile at a gear 10, here shown as a straight tooth spur gear. Constituting part of the equipment is a support or carrier 12 which can move to-and-fro in relation to the gear 10 in the lengthwise direction of its not particularly referenced gear teeth, and it is unimportant whether such movement is performed by the gear 10 or by the support 12. Equally immaterial in the context of the present disclosure is the manner in which the components of the generating movement, needed for producing the involute tooth profile, are distributed at the gear 10 and the support 12.

The support 12 comprises a roll or roll guide means 14 which guides a radial up-and-down movable grinding wheel support or grinder support 16, such movement being accomplished in relation to the gear 10. At the grinding wheel support 16 there is rotatably mounted a grinding wheel spindle 18 together with the dished grinding wheel 20 which is secured thereon and guided so as to be axially advancable. The mounting and drive arrangement for the axial advance or feed of the grinding spindle 18 together with the grinding wheel 20 can be accomplished in known manner, for instance as taught in the aforementioned German patent publication No. 2,644,890 and the corresponding U.S. Pat. No. 4,143,637, to which reference may be readily had and the disclosure of which is incorporated herein by reference.

A further roll guide or roll guide means 22 is formed at the grinding wheel support 16. At this further roll guide means 22 there is guided for up-and-down movement a dressing carriage or slide 24, this movement being parallel to the direction of movement of the grinding wheel support 16, in other words likewise radially in relation to the gear 10. Mounted at the dressing carriage 24, upon a pivot shaft 28, is a tool support or carrier 26 in the form of a rocker arm or balance. This pivot shaft 28 extends essentially parallel to the grinding wheel spindle 18. Mounted upon the tool support 26 is a dressing tool 30 in the form of a roll or roller element stocked with diamonds, as is well known in this technology, the axis of rotation of which is parallel to the pivot shaft 28 and whose outer surface has a concave profile. In order to drive this roll-shaped dressing tool 30 there is arranged a drive motor 32 likewise at the tool support 26.

The tool support 26 is prebiased by means of a restoring spring 34 or equivalent structure in such a manner that it contacts or rests against a cam or templet 38 or the like by means of a roll or roller 36 which is mounted thereat. The cam 38 is guided to be vertically displaceable at the dressing carriage or slide 24. The pivot shaft 28 and the roll 36 are arranged, with respect to the dressing tool 30, in such a manner and the cam 38 is configured to be wedge-shaped in such a manner that a downwardly directed shifting or displacement of the cam 38 in relation to the dressing carriage 24 causes a rocking or pivoting of the tool support or carrier 26 in the clockwise direction, by means of which the dressing tool 30 comes into engagement with the jacket or outer surface of the grinding wheel 20.

Furthermore, attached to the dressing carriage 24 is a feeler or feeler means 40, and specifically in such a way that it moves exactly along the vertical diameter of the grinding wheel 20, whenever the dressing carriage or slide 24 moves vertically up or down within its roll guide 22 in relation to the grinding wheel support 16.

Continuing, the grinding wheel support 16 and the dressing carriage 24 have operatively associated therewith a common radial drive or radial drive means 42 for their adjustment in the vertical. The radial drive 42 is provided with a threaded spindle 44 which is rotatably mounted at the support or carrier 12, but however axially non-displaceably mounted. The threaded spindle 44 is in threaded engagement with a nut member 46 mounted at the grinding wheel support 16. The radial drive means 42 further contains a pinion 48 which is mounted at the grinding wheel support 16. The pinion 48 simultaneously meshes with two oppositely situated racks 50 and 52, of which one of the racks, such as the rack 50 is formed or attached to the support 12 and the other rack 52 is formed or attached to the dressing carriage or slide 24.

Secured to the threaded spindle 44 is a gear 54 which meshes with a pinion 56. This pinion 56 is attached to a ratchet wheel 58 and is conjointly rotatably mounted therewith at the support or carrier 12. The ratchet wheel 58 has operatively associated therewith a pawl 60 which is connected with a piston 62. The piston 62 is displaceable within a cylinder 64, stationarily arranged with respect to the support 12, displacement of the piston 62 being against the resistance of a spring 66 or the like when a pressurized fluid medium, such as preferably hydraulic oil, is effective at the left-hand face of the piston in the showing of FIGS. 1 to 4. This hydraulic oil is delivered by a pump 68 and infed by means of a valve 70 and a line or conduit 72 to the cylinder 64.

In order to displace the cam 38 in relation to the dressing carriage 24 there is provided an additional or auxiliary drive 74. Constituting part of the additional drive 74 is a threaded pin or plug 76 which is secured at the templet or cam 78 or equivalent structure, this threaded pin 76 threadably engaging with a threaded nut member 78. This threaded nut member or nut 78 constitutes part of an additional threaded spindle 80 which is connected with the heretofore described threaded spindle 44 by a flexible shaft 82 in such a manner that both threaded spindles always rotate simultaneously and by the same amounts. The additional threaded spindle 80 is rotatably mounted in a piston 84 in such a manner that it only can axially shift in conjunction with this piston 84. The piston 84 is guided within a cylinder 86 which is formed at or attached to the dressing carriage 24 and is connected above the piston with the line or conduit 72. Between the piston 84 and the dressing carriage or slide 24 there is clamped a spring 88 which strives to upwardly press the piston 84.

At the underside of the support or carrier 12 there is secured a photocell arrangement 90 which always delivers a pulse to a control device 92 when the gear 10 has further indexed by one tooth division. Constituting part of the control device 92 is a first standard pulse counter which can be set to a certain tooth number by means of a rotatable setting knob 94, and following the machining of which tooth number there should occur a dressing operation. A further part of the control means or device 92 is an adjustable timing relay which can be set by a rotatable setting knob 96, which determines the duration of each individual dressing operation. Finally, also constituting part of the control device 92 is a signal transmitter which can be adjusted by a rotatable setting knob 98, this signal transmitter being intended to initial the number of dressing cycles during triggering thereof. Since the pulse counter, timing relay and signal transmitter of the control means 92 are conventional and well known components in the electronics art, they have not been particularly illustrated to simplify the showing of the drawings.

As soon as the number of pulses delivered by the photocell arrangement 90 or equivalent structure to the control device 92 corresponds to the number which has been set at the rotatable setting knob 94, then the valve 70 receives a pulse by means of which such valve is opened. Consequently, pressurized fluid medium flows by means of the line or conduit 72 into both of the cylinders 64 and 86, so that both of the pistons 62 and 84, respectively, are shifted against the force of the related springs 66 and 88, respectively. The pawl 60 driven by the piston 62 rotates the ratchet wheel 58 through a certain angle, so that the threaded spindle 44 likewise is rotated through a predetermined angle, and thus, is screwed out of the nut member 46. Consequently, the grinding wheel support 16 moves downwardly through a predetermined path, which, by virtue of the engagement of the pinion 48 with the racks 50 and 52, causes the dressing carriage 24 to move downwardly through twice this distance or path. Hence, the dressing carriage 24 downwardly entrains the piston 84 together with the additional threaded spindle 80. However, at the same time the piston 84 together with the additional threaded spindle 80 is moved downwardly, as mentioned, in relation to the dressing carriage 24 by virtue of the pressurized fluid medium which flows into the cylinder 86, so that there occurs a downwardly directed relative movement of the cam 38 in relation to the dressing carriage 24. This relative movement, in turn, causes the cam 38 to rock the tool support 26 out of its base position illustrated in FIGS. 1 and 2 into the engagement position of FIG. 3, where the dressing tool 30 loosely engages with the outer or jacket surface of the grinding wheel or disk 20.

The described relative movement of the cam 38 in relation to the dressing carriage 24 has superimposed thereon a further relative movement, which is generated by virtue of the fact that the flexible or bendable shaft 82 transmits the rotation of the threaded spindle 44 to the additional threaded spindle 80 and rotates the latter in such a manner that the threaded nut 78 is downwardly threaded through a certain angle from the threaded pin 76, and thus, the 38 is additionally downwardly forced. Consequently, the tool support 26 has imparted thereto an additional pivoting in the clockwise direction, so that the dressing tool 30 penetrates by a certain predetermined amount into the grinding wheel 20 and dresses such grinding wheel.

After expiration of the set, more or less short time interval, during which the valve 70 permits pressurized fluid medium to flow into the cylinders 64 and 86, the valve 70 then again interrupts the flow connection between the pump 68 and the line or conduit 72 and flow communicates the line 72 with a not particularly illustrated, pressureless supply container or tank from which the pump 68 sucks-up the pressurized fluid medium. The pressure relief of the cylinders 64 and 86 results in the pistons 62 and 84 being forced back into their starting position by the action of the related springs 66 and 88. Nothing however changes as far as the angular rotational position of the threaded spindles 44 and 80 is concerned, but however the piston 84 upwardly entrains the threaded spindle 80 together with the cam 38, so that the tool support 26 again assumes a base position where the dressing tool 30 does not contact the grinding wheel 20. This new base position differs from the original base position in that, the dressing tool 30 and also the feeler 40 are located lower than was previously the case by the amount of the advance or feed movement of the toolsupport 26, and additionally the dressing tool 30 is situated lower, in relation to the dressing carriage or slide 24, than in the original base position, and specifically, in accordance with the amount through which the threaded spindle 80 has been rotated, and in consequence of which the cam 38 has been shifted downwardly in relation to the dressing carriage 24, and thus, has pivoted the tool support 26. What is reestablished however after each dressing cycle is only that pivotal movement of the tool support 26 which has been brought about by the downwardly directed shifting of the piston 84 in relation to the cylinder 86.

Figure 5:
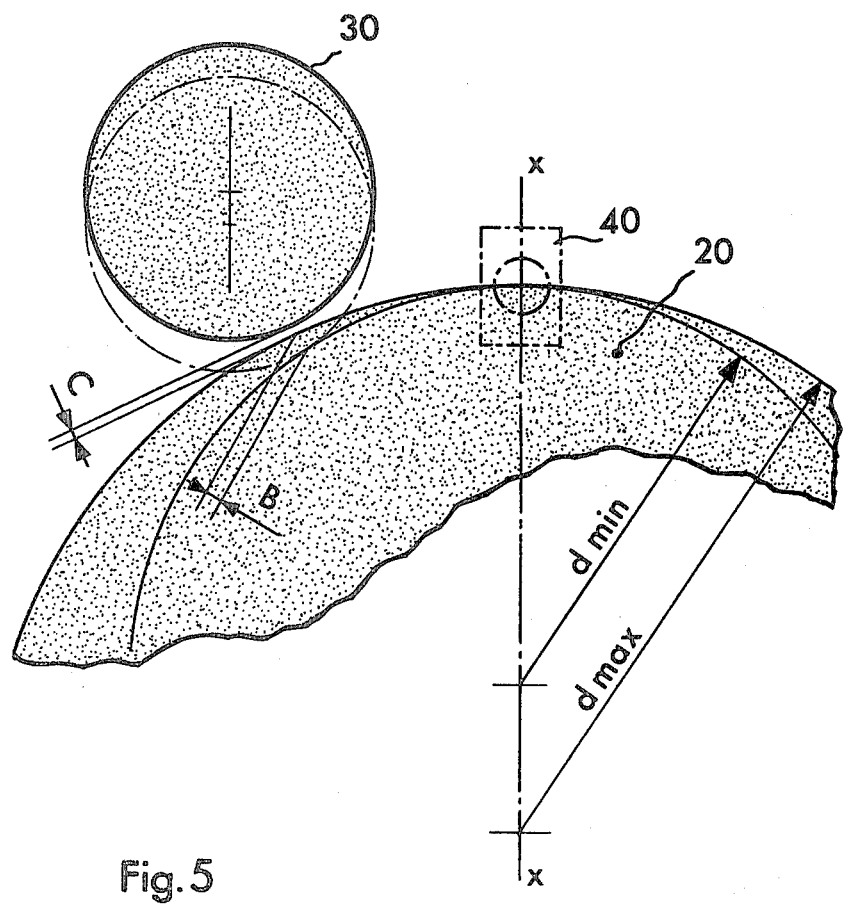
FIG. 5 illustrates the geometric relationships between the grinding wheel, dressing tool and feeler.

Finally, in FIG. 5 there are illustrated the geometric relationships between the grinding wheel 20, the dressing tool 30 and the feeler 40. It is assumed that the grinding wheel 20 has worn from a maximum diameter at the start of its use at a tooth flank-grinding machine to a minimum diameter. With the dressing tool 30 located externally of the grinding wheel axis X - X, such must not be shifted with maximum wear approximately through the magnitude (d max−d min)/2, rather only by the amount B+C.

While there are shown and described present preferred embodiments of the invention, it is to be distinctly understood that the invention is not limited thereto, but may be otherwise variously embodied and practiced within the scope of the following claims.

Accordingly, what I claim is:

1. A dressing apparatus for a dished grinding wheel of a tooth flank-grinding machine, comprising:
   a dressing carriage;
   radial drive means for radially advancing the dressing carriage in relation to the grinding wheel;
   a dressing tool for dressing the outer surface of the grinding wheel;
   a feeler carried by the dressing carriage and serving for scanning a working end surface of the grinding wheel;
   said feeler always moving radially during such axial feed of the grinding wheel;
   said radial drive means moving said dressing tool and said feeler;
   a tool support means at which the dressing tool is arranged in offset relationship with respect to the feeler in the circumferential direction of the grinding wheel;
   said tool support means being displaceably arranged at and carried by the dressing carriage for movement essentially parallel to the working end surface of the grinding wheel;
   additional drive means for controlling the tool support means; and
   said additional drive means being operatively connected with said radial drive means.

2. The dressing apparatus as defined in claim 1, wherein:
   said tool support means comprises rocker arms means pivotably mounted at said dressing carriage.

3. The dressing apparatus as defined in claim 2, wherein:
   said radial drive means for said dressing carriage comprises a threaded spindle;
   said additional drive means comprises an additional threaded spindle mounted at the dressing carriage; and
   said additional threaded spindle being coupled with said threaded spindle of the radial drive means.

4. The dressing apparatus as defined in claim 3, further including:
   a flexible shaft for coupling said additional threaded spindle with the threaded spindle of the radial drive means.

5. The dressing apparatus as defined in claim 4, further including:
   piston means with which said additional threaded spindle is connected for conjoint axial shifting; and
   a cylinder provided for the dressing carriage and within which there is displaceably arranged said piston in the lengthwise direction of the additional threaded spindle.

6. The dressing apparatus as defined in claim 5, further including:
   pawl means;
   a piston-and-cylinder means cooperating with said pawl means for conjointly driving said additional threaded spindle and said threaded spindle of the radial drive means; and
   said cylinder of said piston-and-cylinder means being conjointly connected with the cylinder of the dressing carriage by means of a valve with a source of pressurized fluid medium 7. The dressing apparatus as defined in claim 3, further including:
   cam means with which engages said additional threaded spindle; and
   said cam means being displaceable guided at said dressing carriage and supporting said tool support.

8. The dressing apparatus as defined in claim 7, further including:
   a grinding wheel support for guiding the dressing carriage;
   said grinding wheel support carrying the grinding wheel;
   support means for guiding said grinding wheel support;
   a pinion mounted at said grinding wheel support;
   a pair of oppositely situated racks with which engages said pinion; and
   one of said racks being provided at said support means and the other or said racks being provided at said dressing carriage.

9. A dressing apparatus for a dished grinding wheel of a tooth flank-grinding machine, comprising:
   a dressing carriage;
   radial drive means for radially advancing the dressing carriage in relation to the grinding wheel;
   a dressing tool for dressing the grinding wheel and carried by said dressing carriage;
   a feeler for scanning a predetermined surface of the grinding wheel and carried by said dressing carriage;

said radial drive means moving said dressing tool and said feeler;

a tool support means at which the dressing tool is arranged in offset relationship with respect to the feeler in the circumferential direction of the grinding wheel;

said tool support means being displaceably mounted at and carried by the dressing carriage for movement essentially parallel to the grinding wheel;

additional drive means for controlling the movement of the tool support means; and said additional drive means being operatively coupled with said radial drive means.

* * * * *

UNITED STATES PATENT AND TRADEMARK OFFICE
CERTIFICATE OF CORRECTION

PATENT NO. : 4,483,103

DATED : November 20, 1984

INVENTOR(S) : Bickel

It is certified that error appears in the above-identified patent and that said Letters Patent is hereby corrected as shown below:

Column 6, line 55, after "the" please insert --cam--.

Signed and Sealed this

Ninth Day of April 1985

[SEAL]

Attest:

DONALD J. QUIGG

Attesting Officer

Acting Commissioner of Patents and Trademarks